March 11, 1969   H. FLEISHER ET AL   3,432,222
OPTICAL SCANNING DEVICE

Filed Sept. 30, 1964    Sheet 1 of 2

INVENTORS
HAROLD FLEISHER
KURT M. KOSANKE
WERNER W. KULCKE
ERHARD MAX

BY Charles P. Boberg
ATTORNEY

FIG. 2
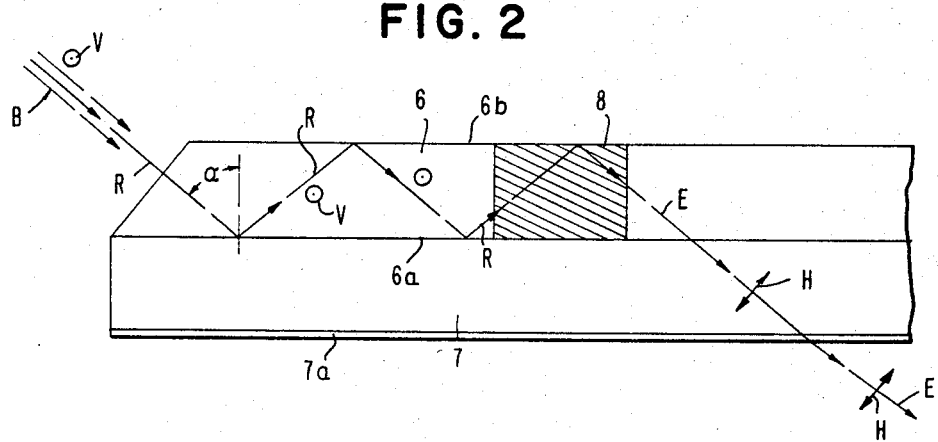
FIG. 3A
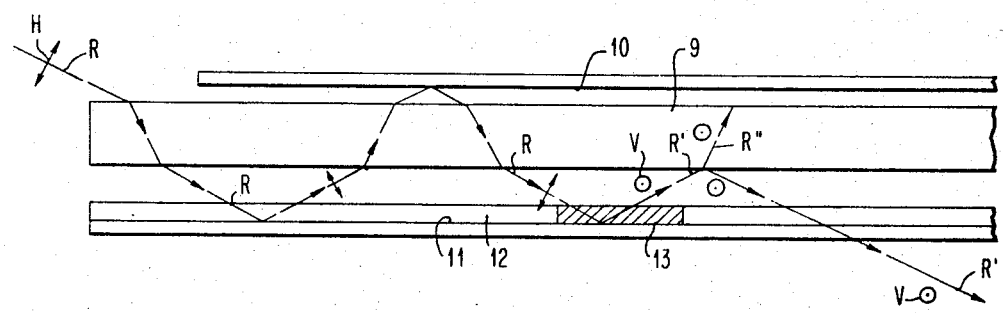
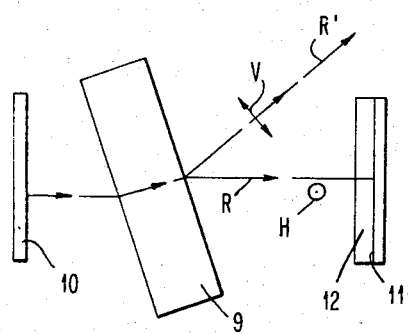
FIG. 3B

United States Patent Office 3,432,222
Patented Mar. 11, 1969

3,432,222
OPTICAL SCANNING DEVICE
Harold Fleisher, Poughkeepsie, Kurt M. Kosanke, Wappingers Falls, Werner W. Kulcke, Poughkeepsie, and Erhard Max, Wappingers Falls, N.Y., assignors to International Business Machines Corporation, New York, N.Y., a corporation of New York
Filed Sept. 30, 1964, Ser. No. 400,532
U.S. Cl. 350—149       14 Claims
Int. Cl. G02f 1/24, 1/26, 1/28

ABSTRACT OF THE DISCLOSURE

A laser beam is caused to execute a scanning movement along a path through which a discrete pulse of scanning excitation is propagated, the displacement of the scanning beam being commensurate with that of the scanning pulse. The path is defined in part by a pair of parallel mirrors or other reflecting surfaces extending lengthwise of the path. The laser beam is directed on a zigzag course along the path between these mirrors, repeatedly crossing and recrossing an elongated body of optically activable material through which the pulse of scanning excitation is being propagated. Wherever the beam encounters a region of the optionally activable material that is being excited by the pulse, the polarization plane of the beam is rotated. A polarization-sensitive means such as a birefringent crystal disposed in the path causes the rotated beam to be deflected so that it escapes one of the mirrors and emerges as an output beam, the position of which shifts with the passage of the scanning pulse along the path.

---

Figure 1A:
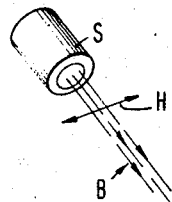

This invention relates to optical scanning or light deflecting devices of the type in which a scanning or deflecting excitation is applied to an optically activable medium for varying the position of a light beam transmitted by said medium.

The term "optically activable medium" refers to a medium which can be excited by an applied stimulus to change its optical properties, either by changing from an optically isotropic state to an optically anisotropic state or by varying its degree of optical anisotropy. Typical stimuli are electric fields or sonic waves, but in general, a stimulus might be any kind of energy capable of changing the optical properties of the stimulated medium. In this sense radiation, heat and so forth also can be considered as stimuli.

There are several ways in which optically activable media can be used to effect scanning. For example, it has been proposed in one type of prior scanning device to transmit a narrow beam of light through an optically activable medium excited by a standing electric wave or an electrostatic field of varying magnitude, thereby causing the beam to be variably refracted through the medium so that it sweeps through a limited angle. The amount of beam deflection that can be produced in this way is quite small, however, and for practical use it is necessary to amplify this initially limited scanning motion by a path-lengthening technique that weakens the resolution of the beam. Another approach that has been followed is to illuminate a body of optically activable material simultaneously at all points thereon but permit the light to emerge from only a small portion of this medium in which a temporary optical activity has been induced, the position of the optically activated portion changing under the influence of the scanning excitation. This method produces a scanning beam that may have high resolution, but it wastes a very large percentage of the energy supplied by the light source if the medium is incapable of storing such energy; hence, the technique is unsuitable for use with a light source of high radiation density, such as a laser, that requires efficient utilization of its energy in order to be practical.

An object of the present invention is to achieve a high-speed, high-resolution scanning beam having the desired excursion without wasting any substantial amount of light energy.

Another object is to simplify the construction of scanners utilizing optically activable media so that such devices can be more practically employed.

A further object is to facilitate the use of a laser beam or the like for optical scanning purposes by enabling the energy of such a beam to be temporarily stored within an optical system and progressively released therefrom at the successive points which are to be scanned by the beam, all without any substantial loss of beam resolution.

More specifically, the invention utilizes a concentrated beam of monochromatic, linearly polarized light (preferably supplied by a laser) that is guided by parallel, mutually reflecting surfaces along a zigzag course through an optically activable medium, generally following a path in said medium paralleling said surfaces. An electric or sonic pulse is propagated along this path, momentarily including a predetermined birefringent state in the elemental portion of the medium where the pulse is concentrated at each instant. When the light beam encounters this pulse-induced anisotropy in the medium, the light beam acquires a polarization different from that which it ordinarily has. The arrangement is such that light rays which acquire this extraordinary polarization will be directed in such a way as to escape the light-reflecting surfaces of the optical system. The beam therefore emerges from the system at a point determined by the progress of the aforesaid activating pulse through the optically activable medium. Inasmuch as the activating pulse travels along a path of substantially the same length as the path that the beam is to scan, it is not necessary to employ a path-lengthening technique for amplifying the transverse displacement or scanning motion of the output beam, and the beam therefore retains a high resolution. Moreover, it is not necessary to utilize an excessive amount of light for illuminating the optically activable medium inasmuch as the device enables a narrow beam of light to be guided through the medium substantially without loss of energy to any discrete position in the locus of the scanning beam, thereby effectively storing the light energy while conducting such energy to the point where it is needed. In this respect the device may be regarded as a variable-length transmission line for the light rays.

The foregoing and other objects, features and advantages of the invention will be apparent from the following more particular description of preferred embodiments of the invention, as illustrated in the accompanying drawings.

Figure 1B:
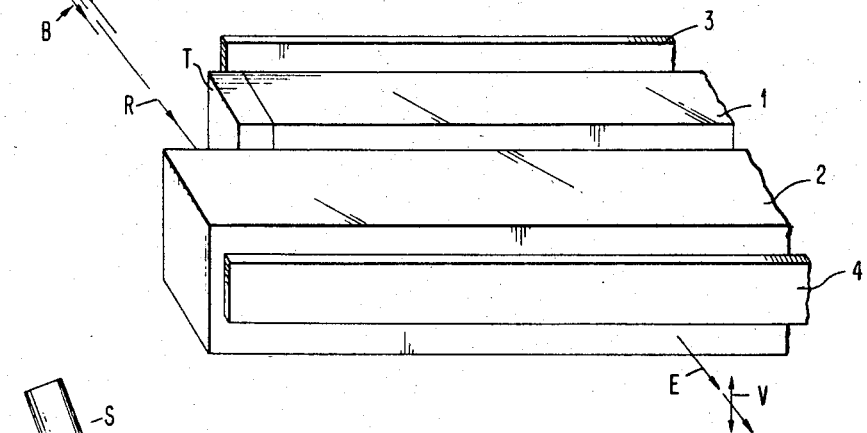
Figure 1C:
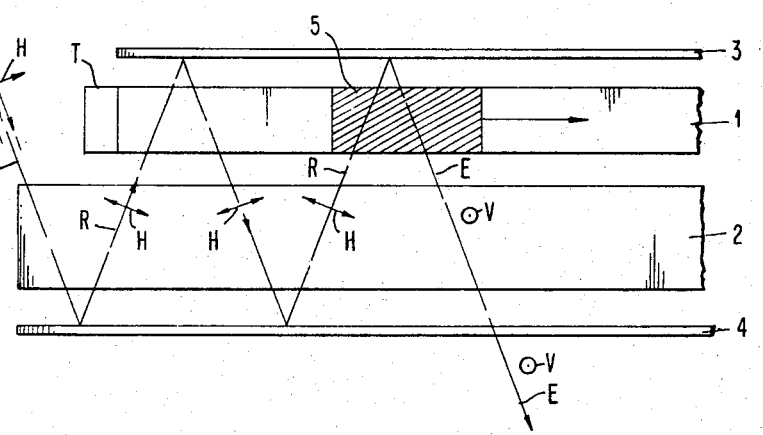
Figure 1C:
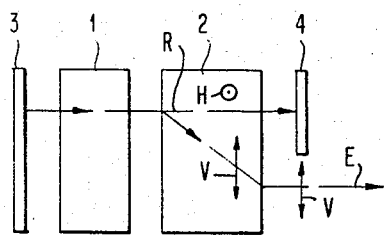

FIGS. 1A, 1B, and 1C, respectively, are enlarged perspective, plan and end views showing an exemplary embodiment of the invention.

FIG. 2 is a plan view depicting another embodiment of the invention.

FIGS. 3A and 3B, respectively, are plan and end views showing still another embodiment of the invention.

The embodiment of the invention illustrated in FIGS. 1A, 1B and 1C utilizes a transparent, optically activable medium 1 comprising, for example, a stress-optic material as an acrylate resin (e.g., Plexiglas or Lucite) which is activable by mechanical stimulus, or an electro-optic material such as ammonium dihydrogen phosphate (ADP), potassium dihydrogen phosphate (KDP), deuterated KDP, cupreous chloride or barium titanate activable by electric stimulus, arranged in an elongated energy transmission path between two plane, parallel mirrors 3 and 4, respectively. In the embodiment presently under consideration the medium 1 is either optically isotropic in its natural state, or it is rendered normally isotropic by compensating optical means or a biasing electric field (not shown). An elongated transparent body 2 of birefringent material, such as a calcite or sodium nitrate crystal, is interposed between the medium 1 and the mirror 4. As shown in FIGS. 1A and 1B, the media 1 and 2 are illuminated by a narrow, discrete beam B of monochromatic, linearly polarized light supplied by a suitable source S, such as a ruby laser. It is assumed for illustrative purposes that the beam B is incident upon the aforesaid media in the horizontal plane and that it comprises rays of light such as R which ordinarily are polarized in a horizontal direction, as indicated by the symbol H in FIGS. 1A, 1B and 1C. The light beam B is so directed that each of the rays R in this beam ordinarily will be guided back and forth in a zigzag course between the mirrors 3 and 4, passing repeatedly through the elongated crystals 1 and 2, as shown in FIG. 1B, while generally progressing along the path extending lengthwise of crystal 1. Thus, the elongated form of medium 1 and the reflecting surfaces of the mirrors 3 and 4 define the general direction of the path followed by the light rays R in their zigzag course. It is assumed for the purpose of the present description that the transmission of light through the crystals 1 and 2 occurs without any appreciable loss of energy, irrespective of the number of reflections that may take place, so that the illustrated device may be regarded in one sense as a means for temporarily storing the energy of the light beam B until it is needed. For simplicity of illustration, the present showing ignores the minor refractions of light which occur at the various interfaces.

The crystal 1 of optically activable material also serves as a line for transmitting a pulse of scanning excitation which periodically is generated by a suitable transducer associated with the crystal 1. Such a pulse may be electric or sonic in nature, depending upon the speed of propagation which is desired. The drawings schematically depict a piezoelectric transducer T, FIGS. 1A and 1B, which is positioned at one end of the pulse transmission line 1 for propagating a sonic pulse periodically along this line. However, the medium 1 also could be associated with electrodes for periodically generating electric pulses that travel along the line 1. Wave absorbers, which in practice may be associated with the medium 1, are omitted from the present showing.

In its normal state the medium 1 does not effect any change in the polarization of the light rays R that pass through it. However, in the elemental region of the medium indicated by the hatched area 5 in FIG. 1B, where the traveling pulse happens to be concentrated at the instant under consideration, the medium is rendered optically anisotropic or birefringent by virtue of this excitation. The effect of this activation by the pulse is such that any light ray which passes twice through the optical anisotropy 5 will undergo a 90° rotation in its direction of polarization, so that a horizontally polarized ray R which passes through the region 5 and then is reflected back through this same region again by the mirror 3, for example, will emerge therefrom as a ray E having a vertical polarization, as indicated by the symbol V in FIGS. 1A, 1B and 1C. The birefringent medium 2 has no significant influence upon the horizontally polarized rays R, which are transmitted as ordinary rays therethrough, but the vertically polarized rays E are extraordinary rays that are refracted by the medium 2 in such a way that they pass beneath the lower edge of the mirror 4 (which is relatively narrow) as is shown best in FIG. 1C. It is assumed, of course, that there is a very substantial difference between the propagation directions of the ordinary and extraordinary rays in the medium 2, this being especially true of the birefringent materials cited as examples hereinabove. The position where the rays E emerge from beneath the mirror 4 will depend upon the position attained by the traveling anisotropy 5 in its excursion lengthwise of the medium 1; hence the beam comprising the rays E will be continually shifted horizontally to the right (as viewed in FIG. 1A) as the anisotropy 5 travels in that direction.

It should be understood that the terms "horizontal" and "vertical" are used only in a relative sense in the present description. None of the embodiments herein disclosed is limited to any particular spatial orientation of its structure.

FIG. 1B does not necessarily represent the relative widths of the anisotropic region 5 and the light beam B with accuracy. The principal consideration to be observed in this regard is that the anisotropic segment 5 should be sufficiently narrow to afford the desired resolution of the emerging light beam and yet be sufficiently wide so that it cannot be bypassed by any substantial quantity of the light rays R as they travel in their zigzag course through the medium 1.

To summarize the operation of the scanning device which is illustrated in FIGS. 1A, 1B and 1C, the collimated, monochromatic light beam B entering this device is guided generally along a linear path extending between and paralleling the mirrors 3 and 4, while at the same time being reflected diagonally back and forth across this path through the optical media 1 and 2 by said mirrors, until the advancing light rays finally encounter a localized optical anisotropy 5 in the medium 1, induced therein by a pulse of scanning excitation which is traveling along the medium 1. At that point the light is released from the optical system, and it emerges therefrom as a beam which transversely shifts its position along a desired scanning path in synchronism with the passage of the scanning pulse through the medium 1. With this mode of operation, no substantial amount of the light energy entering the optical system will be wasted. The total excursion of the emerging light beam is commensurate with the distance through which the optical anisotropy 5 travels, and this can be made sufficiently great so that little or no amplification of the beam excursion is required, thereby preserving the high resolution which the light beam has when it emerges from the path extending through the optical media 1 and 2.

It is possible also to induce a local anisotropy in the medium 1 by directing an electron beam into this medium, thereby imparting a transient electrical charge to the impinged area of the medium. In this instance the scanning action is accomplished by sweeping the electron beam along the length of the crystal 1 for progressively releasing the entrapped light rays is synchronism with the movement of the electron beam.

FIG. 2 shows another embodiment of the invention which dispenses with the use of separate mirrors and utilizes the front and back faces of an optically activable medium 6 as internal reflecting surfaces for confining a light beam within this medium. In this construction an elongated crystal 6 of optically activable material, which also is normally birefringent, is positioned adjacent to elongated birefringent element 7. The respective materials in the elements 6 and 7 are so chosen that their extraordinary indices of refraction are approximately equal. Furthermore, the medium 6 has an ordinary index of refraction much greater than its extraordinary index of refraction, whereas the medium 7 has an ordinary index of refraction much less than its extraordinary index of refraction.

The medium 6 is illuminated by a monochromatic light beam B, FIG. 2, composed of light rays such as R which are linearly polarized in a vertical direction (that is, perpendicular to the assumed plane of the paper) as indicated by the symbol V. This beam is directed into the medium 6 through an oblique end face normal to the beam so that each ray as R makes an angle α with a line drawn normal to the interface between the media 6 and 7. The polarization of the ray R is such that this ray is propagated through the birefringent medium 6 as the ordinary ray. It will be recalled that the medium 6 has an ordinary index of refraction much greater than the ordinary index of refraction of the medium 7. That is to say, the medium 6 is optically much more dense than the medium 7 insofar as the ordinary light ray R is concerned. The angle of incidence α at the interface 6a between the media 6 and 7 is not less than the critical angle for these two media, so that the ordinary ray R is totally reflected at this interface, passing back through the medium 6 toward the other interface 6b between said medium and the surrounding air, which likewise is much less dense than the medium 6. Inasmuch as the ray R impinges against this latter interface at an angle of incidence not less than the critical angle, it again is totally reflected back through the medium 6. Thus, the ordinary ray R, which is polarized in a direction parallel to the respective interfaces of the medium 6 with the less dense media adjacent thereto, readily enters the medium 6 from the air but thereafter is totally reflected back and forth along diagonal lines within the elongated medium 6 while generally following a path extending lengthwise of this medium 6.

In order to release the entrapped light ray R from the medium 6, a suitable activating pulse (supplied by a transducer which is not shown) is transmitted along the transmission line afforded by the medium 6, thereby inducing a predetermined state of optical anisotropy in the elemental portion of the medium 6 where the pulse is concentrated, as indicated by the hatched area 8 in FIG. 2. When an ordinary ray R encounters the localized anisotropy 8 wherein the medium 6 has been momentarily disturbed by the pulse, the ray R undergoes a change in its direction of polarization. After the first passage through medium 6 the beam is still totally reflected at the interface between the medium 6 and the air, but by the time the beam completely traverses the region 8 in which the anisotropy exists, it no longer is polarized vertically as the ordinary ray and now becomes the extraordinary ray E, having a polarization H (assumed to be horizontal in this case) which differs by 90° from the polarization V of the ordinary ray R. Inasmuch as the media 6 and 7 have approximately the same extraordinary indices of refraction, the extraordinary ray E passes through the interface between the media 6 and 7 substantially without reflection. After traversing the medium 7, the ray E encounters a nonreflective transparent coating 7a on the outer face of the medium 7. It passes through this coating and emerges therefrom into the air with some slight refraction, as indicated in FIG. 2.

It will be understood in this connection that the dimensions of the light beam B and the anisotropy 8 are not necessarily represented on the same scale in FIG. 2. The mode of operation is such that the light beam entering the medium 6 is contained therein until it reaches a point where the scanning pulse has induced an optical anisotropy 8 in this medium, whereupon the beam polarity is shifted so that the beam passes successively through the medium 6, the medium 7 and the non-reflective coating 7a to emerge therefrom at a location determined by the momentary position of the traveling anisotropy 8 in the medium 6. Hence, as the scanning pulse passes lengthwise through the medium 6, it progressively releases the light beam so that the output beam executes a scanning motion in synchronism with the motion of the scanning pulse through the medium 6. Moreover, it is not necessary to the operation of this embodiment that a nonreflective coating 7a be provided on the surface of medium 7. By suitably grinding the surface of medium 7, the light beam can be released by scattering action.

It is not necessary, in order to practice this invention, that the optically activable medium be associated with a polarization-sensitive medium having birefringent properties. If desired, a material such as glass which is not birefringent can be used as the polarization-sensitive medium for directing the scanning beam out of the system at the desired point. FIGS. 3A and 3B illustrate an embodiment in which a glass rod 9 of rectangular cross section is used for this purpose. In order that the glass rod 9 may discriminate between light rays having different directions of polarization, Brewster's law is utilized in the manner which will be explained presently.

Referring now to the details illustrated in FIGS. 3A and 3B, the elongated glass rod 9 is positioned between plane parallel mirrors 10 and 11, and an elongated crystal 12 of optically activable material is positioned adjacent to the reflecting surface of the mirror 11 facing the glass rod 9. As shown in FIG. 3B, the glass rod 9 extends longitudinally in parallel relation to the mirrors 10 and 11 but is inclined slightly from the vertical so that its front and back faces are at an angle of approximately 20° relative to the surfaces of the mirrors 10 and 11, the purpose of this arrangement being explained presently. The incident ray R is linearly polarized in its plane of incidence, which is assumed herein to be horizontal, as indicated by the symbol H. The ray R is directed against the glass rod 9 so that its angle of incidence is equal to the Brewster angle of this material (57° for ordinary glass). This means that the incident ray R will be totally transmitted through the glass rod 9 with substantially no reflection therefrom. As the ray R leaves the glass rod 9, it passes through the medium 12 (which normally is isotropic), then is reflected by the mirror 11 and again passes through the glass rod 9 without reflection. (Minor refractions and reflections are ignored in the present showing.)

The ray R is repeatedly reflected by the mirrors 10 and 11 and is transmitted without reflection by the glass rod 9 (due to the fact that it repeatedly enters the glass at is Brewster angle) until the ray encounters a local anisotropy 13, FIG. 3A, which has been induced in the medium 12 by a suitable transducing means (not shown). The ray R enters the anisotropic region 13, then is reflected by the mirror 11 and again passes through the region 13 toward the glass rod 9. By the time the light ray completes its passage through the optically anisotropic or birefringent region 13 in the medium 12, its direction of polarization is shifted so that now it is a ray R' having an approximately vertical polarization as indicated by the symbol V. The polarization of the ray R' is such that now it can be both refracted and reflected by the glass rod 9. The main portion of the ray R' is reflected by the surface of the glass rod 9 at an upward angle of about 20°, thereby clearing the upper edge of the mirror 11 and escaping from the optical system to provide a scanning beam. A minor portion R" of the ray R', FIG. 3A, passes through the glass rod 9 and is reflected by the mirror 10. However, this ray R" experiences reflection as well as refraction at all surfaces, and after a few further passages back and forth, it totally emerges in close proximity to the ray R' that initially was reflected out of the system by the glass rod 9.

Thus, it will be appreciated from the foregoing that the invention contemplates several ways in which a light polarization shift caused by an induced anisotropy traveling through an optically activable medium may be detected and utilized for releasing a stored or entrapped light beam from an optical system at a point determined by the instantaneous location of the traveling anisotropy. The result is to produce an output beam which executes a desired scanning motion that requires no amplifying or path-lengthening treatment to be usable; nor is it necessary to flood the system with excessive light to achieve this result as has been done in some prior devices. The various embodiments disclosed herein are simple and easy to construct, thereby making the use of such devices practical and economical.

While the invention has been particularly shown and described with reference to preferred embodiments thereof, it will be understood by those skilled in the art that

What is claimed is:

1. An optical scanning device for converting a stationarily positioned input beam of linearly polarized light to a scanning output beam, comprising:
   means constituted and arranged to provide an elongated transmission path for light and other disturbances having
      spaced parallel light reflecting surfaces extending longitudinally of said transmission path for guiding the light of the input beam in the general direction of said path while reflecting such light back and forth across said path as long as the transmitted light retains the polarization of the input beam,
   said path means including an optically activable medium extending longitudinally of said path intermediate said light reflecting surfaces for transmitting the light reflected between said surfaces and for transmitting a discrete scanning excitation along said path to induce in any portion of said medium disturbed by such excitation a temporary anisotropic state whereby light transmitted through said disturbed portion has, upon finally emerging therefrom, a predetermined polarization differing substantially from the polarization of the input beam, and polarization-sensitive light guiding means associated with said optically activable medium for causing light in said medium which has said predetermined polarization to depart from said transmission path and appear as an output beam at a variable position along said path determined by the instantaneous position of the discrete scanning excitation in said medium.

2. An optical scanning device as set forth in claim 1 wherein said polarization-sensitive light guiding means comprises an elongated body of birefringent material adapted to receive light having said predetermined polarization from said optically activable medium and to transmit light having said predetermined polarization in a direction which deviates from said transmission path.

3. An optical scanning device as set forth in claim 1 wherein said polarization-sensitive light guiding means comprises an elongated body of optically isotropic material arranged to receive light from said reflecting surfaces and from said medium in directions such that said body is substantially incapable of reflecting incident light having the polarization of the input beam but will reflect incident light having a substantially different polarization.

4. An optical scanning device for converting a stationarily positioned input beam of linearly polarized light to a scanning output beam, comprising:
   energy transmission means including an optically activable medium disposed between light reflecting surfaces for directing the light of said input beam in a zigzag course that repeatedly crosses but in general follows a given transmission path through said medium,
   means associated with said energy transmission means for periodically propagating a discrete scanning excitation along said transmission path in said medium,
   said medium being so constituted that the portion thereof which is disturbed by such excitation temporarily assumes a predetermined optical anisotropy for imparting to the light transmitted through such disturbed portion a predetermined polarization differing substantially from the polarization of the input beam, and
   polarization-sensitive light guiding means arranged to receive from said medium and to divert from said transmission path light having said predetermined polarization, thereby providing an output beam which is variably positioned along said path in accordance with the passage of the discrete scanning excitation through said medium.

5. An optical scanning device as set forth in claim 4 wherein said polarization-sensive light guiding means is a body of birefringent material having refractive properties which enable it to distinguish light having said predetermined polariaztion from light having the polarization of the input beam.

6. An optical scanning device as set forth in claim 4, wherein said polarization-sensitive light guiding means is a body of optically isotropic material arranged so that it transmits light having the polarization of said input beam substantially without reflection thereof, while substantially reflecting light having said predetermined polarization.

7. An optical scanning device for converting a stationarily positioned input beam of linearly polarized light to a scanning output beam, comprising:
   an optically activable medium arranged to transmit light and other energy in a predetermined path,
   means for directing the input light beam into said medium at one end of said path,
   means for periodically propagating a discrete scanning excitation along said predetermined path in said medium,
   said medium having optical properties such that the portion thereof which is disturbed by such excitation temporarily assumes a predetermined birefringent state such that the light transmitted through this disturbed portion of said medium assumes a predetermined polarization differing substantially from the polarization of the input beam, and
   polarization-sensitive light guiding means associated with said optically activable medium in such a way as to deflect from said predetermined path a beam of light having said predetermined polarization, thereby producing an output beam having a position along said path that varies with the passage of the discrete scanning excitation through said optically activable medium.

8. An optical scanning device as set forth in claim 7 wherein said polarization-sensitive light guiding means is a body of birefringent material constituted and arranged to transmit light having the polarization of the input beam as an ordinary ray in said path and to transmit light having said predetermined polarization as an extraordinary ray out of said path.

9. An optical scanning device as set forth in claim 7 wherein said optically activable medium and said polarization-sensitive light guiding means are adjoining bodies of birefringent materials respectively having ordinary and extraordinary indices of refraction so related that only light having said predetermined polarization can be transmitted through both of said bodies out of said path.

10. An optical scanning device as set forth in claim 7 wherein said polarization-sensitive light guiding means comprises a body of optically isotropic material arranged to receive incident light transmitted through said optically activable medium at an angle such that said body transmits light having the polarization of said input beam substantially without reflection thereof in said predetermined path and substantially reflects light having said predetermined polarization out of said path.

11. An optical scanning device for converting a stationarily positioned input beam of linearly polarized light to a scanning output beam, comprising:
   an optically activable medium arranged in a predetermined path for transmitting light and other disturbances,
   parallel mirrors respectively disposed on opposite sides of said path and in parallel relation therewith for repeatedly reflecting the light of the input beam through said medium and across said path while guiding such light in the general direction of said path, means for propagating a discrete scanning excitation along said path through said medium for temporarily inducing in any portion of the medium disturbed by said excitation a state of optic anisotropy such that light transmitted through said disturbed portion has a predetermined polarization differing substantially from the polarization of the input beam, and a birefringent body interposed between said optically activable medium and one of said mirrors for causing light having said predetermined polarization to be refracted in a manner such that it escapes said mirrors and emerges as an output beam at a position along said path determined by the instantaneous position of the scanning excitation in said medium.

12. An optical scanning device as set forth in claim 11 wherein said medium and said birefringent body are so arranged that light having the polarization of said input beam is transmitted through said birefringent body as the ordinary ray, and light having said predetermined polarization is transmitted through said body as the extraordinary ray.

13. An optical scanning device for converting a stationarily positioned input beam of linearly polarized light to a scanning output beam, comprising:

an optically activable medium arranged in a predetermined path for transmitting light and other disturbances along said path, said medium having a normal birefringent state and also being capable of assuming a different birefringent state when activated.

a second birefringent body adjoining said medium along one edge of said transmission path, said optically activable medium and said second birefringent body being arranged in an angular relation to the input beam and having dissimilar ordinary indices of refraction whereby light having the polarization of the input beam is transmitted as an ordinary ray entirely within said optically activable medium while being reflected internally thereof back and forth across said path, and means for propagating a discrete scanning excitation along said path through said medium for temporarily activating any portion of the medium disturbed by such excitation into a birefringent state such that light transmitted through said disturbed portion becomes an extraordinary ray having a polarization differing substantially by ninety degrees from that of the input beam, said medium and said light guiding means respectively having extraordinary indices of refraction such that light having said extraordinary polarization is transmitted through said medium and said light guiding means in such a way as to emerge from said path at a position longitudinally thereof determined by the instantaneous position of the scanning excitation in said medium.

14. An optical scanning device for converting a stationarily positioned input beam of linearly polarized light to a scanning output beam, comprising:

an optically activable medium arranged in a predetermined path for transmitting light and other disturbances, parallel mirrors respectively disposed on opposite sides of said path and in parallel relation therewith for repeatedly reflecting the light of the input beam through said medium and across said path while guiding such light in the general direction of said path, means for propagating a discrete scanning excitation along said path through said medium for temporarily inducing in any portion of the medium disturbed by said excitation a state of optical anisotropy such that light transmitted through said disturbed portion has a predetermined polarization differing substantially from the polarization of the input beam, and a body of optically isotropic material interposed between said optically active medium and one of said mirrors, said body having surfaces disposed in such relation to said medium and to said mirrors that said body transmits light having the polarization of the input beam substantially without reflection thereof, while substantially reflecting light having said predetermined polarization in a direction such that it escapes said mirrors and emerges as an output beam at a position along said path determined by the instantaneous position of the scanning excitation in said medium.

References Cited

UNITED STATES PATENTS

| 3,243,724 | 3/1966 | Vuylsteke | 350—150 X |
| 3,279,341 | 10/1966 | Arkell et al. | |
| 3,313,938 | 4/1967 | Peters | 350—150 X |
| 3,329,474 | 7/1967 | Harris at al. | 350—150 |
| 3,360,324 | 12/1967 | Hora | 350—160 |

DAVID SCHONBERG, Primary Examiner.

PAUL R. MILLER, Assistant Examiner.

U.S. Cl. X.R.

350—150, 157, 160